United States Patent
Lee et al.

(10) Patent No.: US 7,219,027 B1
(45) Date of Patent: May 15, 2007

(54) OPERATION MONITOR DEVICE FOR HARDWARE COMPONENT

(75) Inventors: Ching-Hung Lee, Taipei (TW); Teng-Lung Liu, Yonghe (TW)

(73) Assignee: Micro-Star Int'l Co., Ltd., Taipei (TW)

( * ) Notice: Subject to any disclaimer, the term of this patent is extended or adjusted under 35 U.S.C. 154(b) by 0 days.

(21) Appl. No.: 11/335,536

(22) Filed: Jan. 20, 2006

(51) Int. Cl.
*G01R 25/00* (2006.01)
(52) U.S. Cl. ........................................ 702/79
(58) Field of Classification Search .................. 702/79
See application file for complete search history.

(56) References Cited

U.S. PATENT DOCUMENTS

| | | | |
|---|---|---|---|
| 6,587,324 B2* | 7/2003 | Lee et al. ...................... | 361/92 |
| 2005/0002133 A1* | 1/2005 | Nam ............................. | 361/18 |
| 2005/0111149 A1* | 5/2005 | Motomori ..................... | 361/18 |

* cited by examiner

*Primary Examiner*—Bryan Bui
*Assistant Examiner*—Demetrius Pretlow
(74) *Attorney, Agent, or Firm*—Rabin & Berdo, P.C.

(57) ABSTRACT

An operation monitor device for a hardware component detects a load current that is changed due to the operation of the hardware component through a pulse width modulation (PWM) module; thereby generating a voltage variation. A monitoring unit outputs a detecting result to a system by detecting the voltage variation and generates a modulating signal in response to a monitor signal fed back by the system according to the detecting result, such that a controller generates a reference voltage variation according to the modulating signal. In this way, the load current changes as the load of the hardware component increases, such that the controller changes the generated reference voltage and further modulates the output voltage supplied to the hardware component by the PWM module, thus meeting the execution state of the hardware component and improving performance.

16 Claims, 5 Drawing Sheets

OPERATION MONITOR DEVICE FOR HARDWARE COMPONENT

BACKGROUND

1. Field of Invention

The present invention relates to an operation monitor device of a hardware component, which is particularly used to control the required voltage and core frequency for the hardware component according to the load current in response to the operation of a hardware component.

2. Related Art

With the rapid development of science and technology, not only national governments and enterprise systems, but also families and individuals are more and more relying on information processing devices. In order to be convenient and to enhance work efficiency, the clock frequency of the corresponding information processing system has also been gradually enhanced.

Therefore, achieving the best performance of an information processing device through overclocking or under clocking of the computer accessories or peripherals has become one of the most common methods. Taking a display card as an example, it has a graphic processing unit (GPU) exclusively used for processing two-dimensional and three-dimensional images. Instruction execution, memory accessing, and the like are synchronized through clock signals. Therefore, the performance of the display card can be enhanced when the frequencies of the clock signals are increased manually.

The conventional modulating of the clock frequency of the display card, i.e., so-called "overclocking" or "underclocking"; is mostly carried out manually by a user. In other words, the overclocking of the display card is achieved through modulating the core frequency and the memory frequency of the display card manually by the user with application software. Modulating the core frequency is equivalent to overclocking/underclocking the core of the GPU, which is similar to overclocking/underclocking the central processing unit (CPU) internal frequency. Modulating the Memory Clock (MCLK) frequency of the display card is equivalent to increase/decrease the access speed of graphics cache, so as to reduce the bottleneck effects of the memory, which is similar to obtaining a larger memory bandwidth through modulating the external frequency of a motherboard.

However, each time before the clock frequency is modulated manually, the user has to refer to the guide manual and consider the configurations of the peripheral components, in order to modulate the frequency successfully. The operating procedures are not only quite complicated, but also frequency modulation errors are likely to occur if the user lacks relevant knowledge. Excessive or insufficient frequency modulation usually causes extra burden for the operation and unnecessary losses of the related hardware component, and accordingly the life time is shortened. Additionally, when the frequency is modulated manually, if an underclocking action is not carried out after the overclocking, the display card is at an overclocking state all the time. Thus, not only the electric power is consumed, but also the life time of the display card is probably shortened as well.

Therefore, the professionals in relevant research and development fields are exerting their efforts on how to adjust the operating parameters of the hardware component automatically and dynamically, so as to avoid involving manual operations and further reducing the losses of the component. Thus, the computer accessories and peripherals are also kept in an optimum condition to provide the best performance. However, it will be known from the above that, how to provide an accurate setting value for reference is a key point for achieving automatic and dynamic adjustment when adjusting the operating parameters of the hardware component. Therefore, how to provide an accurate setting value is also an important research subject in the relevant research and development fields.

SUMMARY

In view of the above problems, an object of the present invention is to provide an operation monitor device for a hardware component to solve the problem in the prior art that the operating parameters for automatically and dynamically adjusting a hardware component and the reference value required cannot be provided thereby, improving the performance of the hardware component and controlling the protection mechanism more effectively.

Therefore, in order to achieve the aforementioned object, the operation monitor device for a hardware component disclosed in the present invention is used to control the output voltage provided to the hardware component, wherein the hardware component is operated within a system. The operation monitor device includes a pulse width modulation (PWM) module, a monitoring unit, and a controller.

Herein, the PWM module is used to generate an output voltage/current to the hardware component according to a reference voltage, and to detect a load current variation due to the operation of the hardware component; thereby generating a voltage variation to be detected by the monitoring unit. And a detecting result is outputted to the system. The system then feeds back a monitor signal to the monitoring unit according to the detecting result. The monitoring unit generates a modulating signal in response to the monitor signal, such that the controller generates a new reference voltage according to the modulating signal. The PWM module modulates the output voltage accordingly. In other words, when the load of the hardware component increases, the corresponding current consumption is also increased, such that the load current outputted by the PWM module is correspondingly changed. With reference to the changed load current, the controller adjusts the generated reference voltage. The PWM module changes the output voltage provided to the hardware component according to the reference voltage, thereby meeting the execution state of the hardware component and improving the performance.

The controller includes a signal converter and a reference voltage generator, wherein the signal converter converts a modulating signal into a set of control signals, and the reference voltage generator generates a new reference voltage according to the set of control signals. Each of the components can be implemented as an integrated circuit, respectively. Furthermore, a conversion table is built in the signal converter, and according to the conversion table, the modulating signal is converted into the set of control signals, thereby changing the voltage required by the hardware component. Additionally, a parameter table is also built in the reference voltage generator, and the reference voltage is modulated according the parameter table and the control signals.

Furthermore, the monitoring unit communicates with the controller, the hardware component, and/or the system through an I2C (Inter-Integrated Circuit) bus, wherein the monitoring unit may be a hardware monitor.

Additionally, the PWM module includes an integrated circuit, a power switch, an output circuit, a first impedance component, and a second impedance component; wherein the integrated circuit changes the generated reference voltage according to the control signal generated by the controller, and further controls the ON/OFF of the power switch, so as to input the input power source to the output circuit, and according to the input power source, the output circuit supplies the output voltage to the hardware component. Also, the first impedance component generates a load current for the integrated circuit according to the load condition of the hardware component, and the integrated circuit obtains a reference current from the output of the power switch, which is compared with the load current to yield the current variation. The current variation is converted by the second impedance component into the voltage variation and then provided to the monitoring unit to be detected. The power switch is formed by a metal-oxide-semiconductor field effect transistor (MOSFET), and the input power source is provided by a power source.

Furthermore, when the hardware component has a heatsink, the monitoring unit will further control the operation of the heatsink according to a monitor signal.

The hardware component may be a processor, such as a GPU or a CPU, a memory, etc. The heatsink may be a fan.

The features and practice of the preferred embodiments of the present invention will be illustrated below in detail with reference to the drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION

The content of the present invention will be illustrated in detail through the following specific embodiments, with reference to accompanying drawings. The symbols mentioned in the specification are made reference to the symbols of the drawings.

Figure 1:
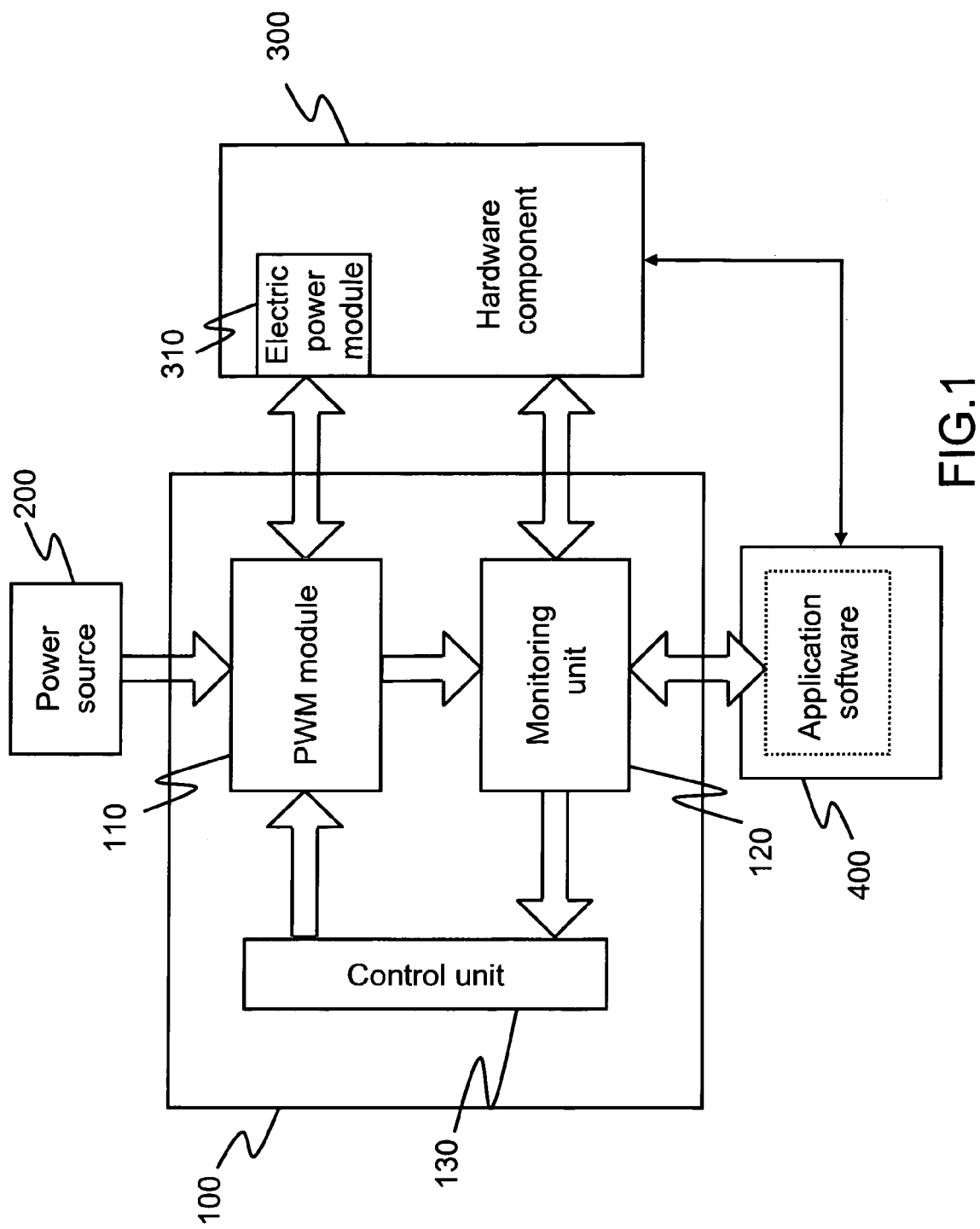
FIG. 1 shows a general structure of an operation monitor device for a hardware component according to a first embodiment of the present invention.

Referring to FIG. 1, it shows a general structure of an operation monitor device for a hardware component according to a first embodiment of the present invention. The operation monitor device 100 for a hardware component includes a pulse width modulation (PWM) module 110, a monitoring unit 120, and a controller 130.

The PWM module 110 is connected to the power source 200 and the electric power module 310 of the hardware component 300 for receiving the input power source from the power source 200 and providing an output voltage/current to the electric power module 310 according to a reference voltage, so as to provide the electric power demanded by the hardware component 300.

When the load of the hardware component 300 is increased, the current supplied to the electric power module 310 by the PWM module 110 is correspondingly increased. Meanwhile, the load current is fed back to the PWM module 110. According to the load current, a current variation is obtained and then converted into a voltage variation to be provided to the monitoring unit 120 to be detected. The monitoring unit 120 generates a detecting result according to the voltage variation. An application of the system 400 converts the detecting result into a practical current value. According to the practical current value, a monitor signal corresponding to a defined modulation item of the application is fed back to the monitoring unit 120 for controlling the monitoring unit 120 to adjust each operating parameter of the hardware component 300.

The monitoring unit 120 generates a modulating signal in response to the monitor signal. The controller 130 generates a new reference voltage according to the modulating signal, such that the PWM module 110 modulates the output voltage supplied to the hardware component 300 according to the reference voltage, so as to meet the execution state of the hardware component 300. Each of the components can be implemented by one or more integrated circuits.

Figure 2:
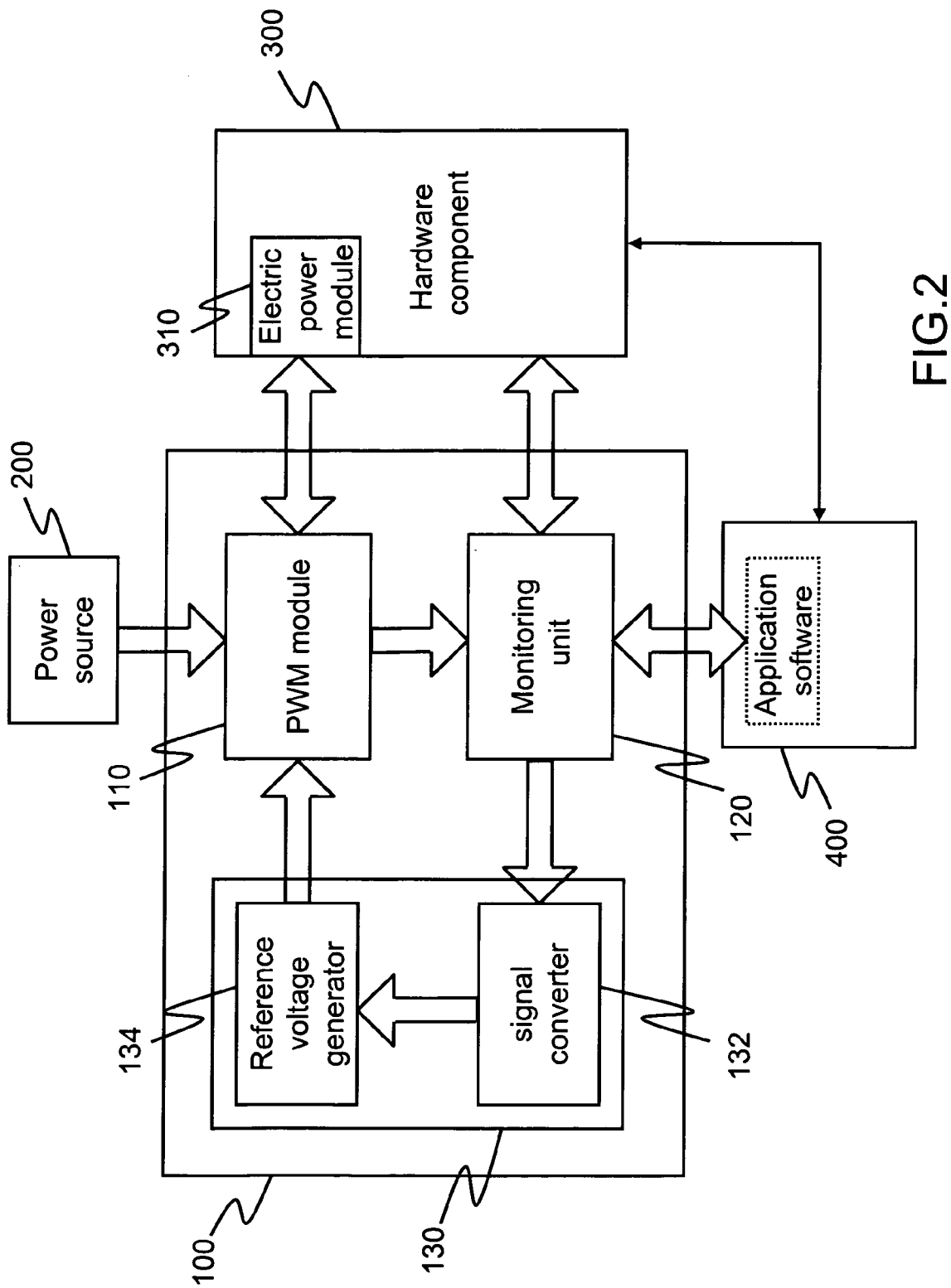
FIG. 2 shows a general structure of the operation monitor device for a hardware component according to a second embodiment of the present invention.

As shown in FIG. 2, the controller 130 includes a signal converter 132 and a reference voltage generator 134, wherein the signal converter 132 converts the modulating signal into a set of control signals, such that the reference voltage generator 134 generates a new reference voltage according to the set of control signals. Here, each component can be implemented by an integrated circuit, respectively.

Figure 3:
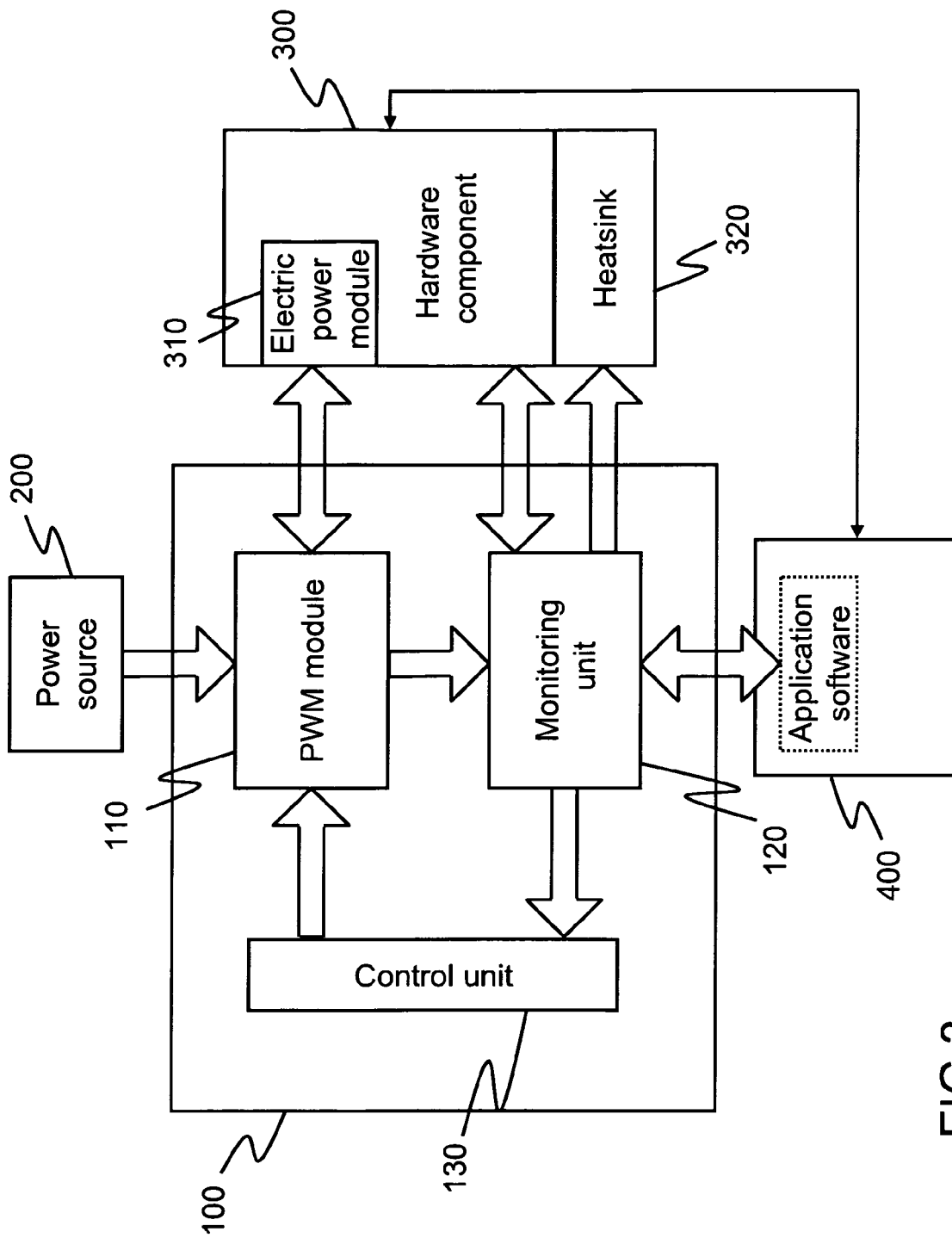
FIG. 3 shows a general structure of the operation monitor device of a hardware component according to a third embodiment of the present invention.

Furthermore, since most of the hardware components 300 produce a lot of heat during operation, a heatsink 320 is required for assisting the heat dispersion of the hardware component 300, and the operation of the heatsink 320 of the corresponding hardware component 300 may be also controlled by the monitor device of the present invention. In other words, the application of the system 400 converts the detecting result from the monitoring unit 120 into a practical current value and feeds back a monitor signal corresponding to a defined modulation item of the application. Meanwhile, the monitoring unit 120 not only generates a modulating signal Vo (shown in FIG. 4) for the controller 130 in response to the monitor signal, but also adjusts the operation of the corresponding heatsink 320 of the hardware component 300 according to the modulating signal, as shown in FIG. 3.

The hardware component may be a processor, such as a GPU or a CPU, a memory, etc. The heatsink of the corresponding hardware component may be a fan.

Figure 4:
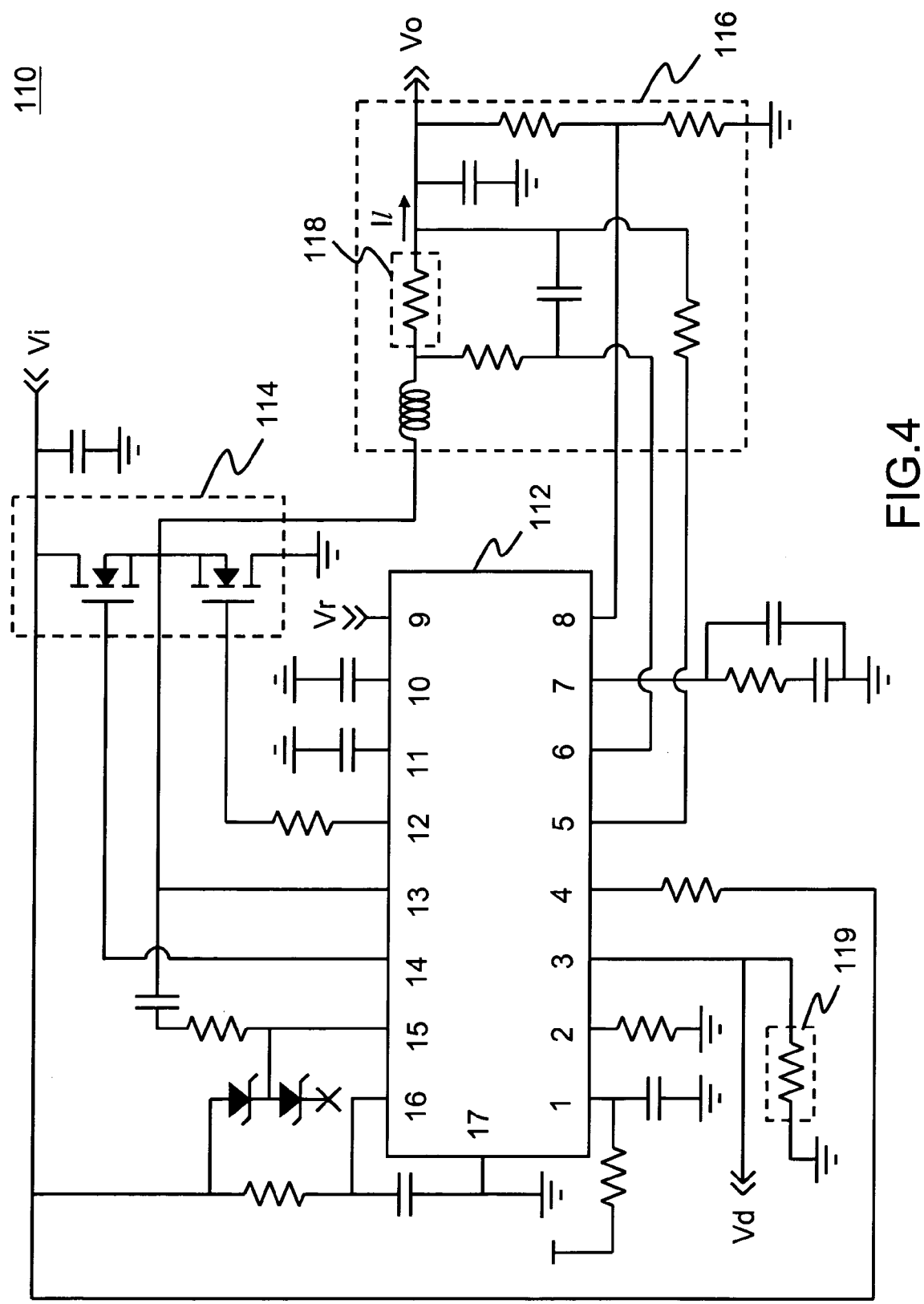
FIG. 4 shows a general structure of an embodiment of the pulse width modulation (PWM) module according to the present invention.

Referring to FIG. 4, it shows an embodiment of the PWM module. The PWM module 110 includes an integrated circuit 112, a power switch 114, an output circuit 116, a first impedance component 118, and a second impedance component 119. The power switch 114 is used for receiving an input power source. The integrated circuit 112 controls the ON/OFF of the power switch 114 according to the reference voltage Vr generated by the controller (not shown), such that the input power source Vi supplied by a power source (not shown) is inputted to the output circuit 116 to generate an output voltage/current for providing the electric power demanded by the hardware component 300. Meanwhile, when the load current Il generated due to the operation of the hardware component passes through the first impedance component 118, a potential difference is generated and is further fed back to the integrated circuit 112. Then, according to the potential difference, a current variation is obtained, which is converted into a voltage variation Vd through the second impedance component 119. The voltage variation Vd is then provided to the monitoring unit 120 (not shown in FIG. 4) to be detected. The power switch may be formed by a MOSFET.

The monitoring unit may be a hardware monitor (H/W monitor). Since the structure and operation principles of the monitoring unit are well known to those skilled in the art, they will not be described herein any more.

Figure 5:
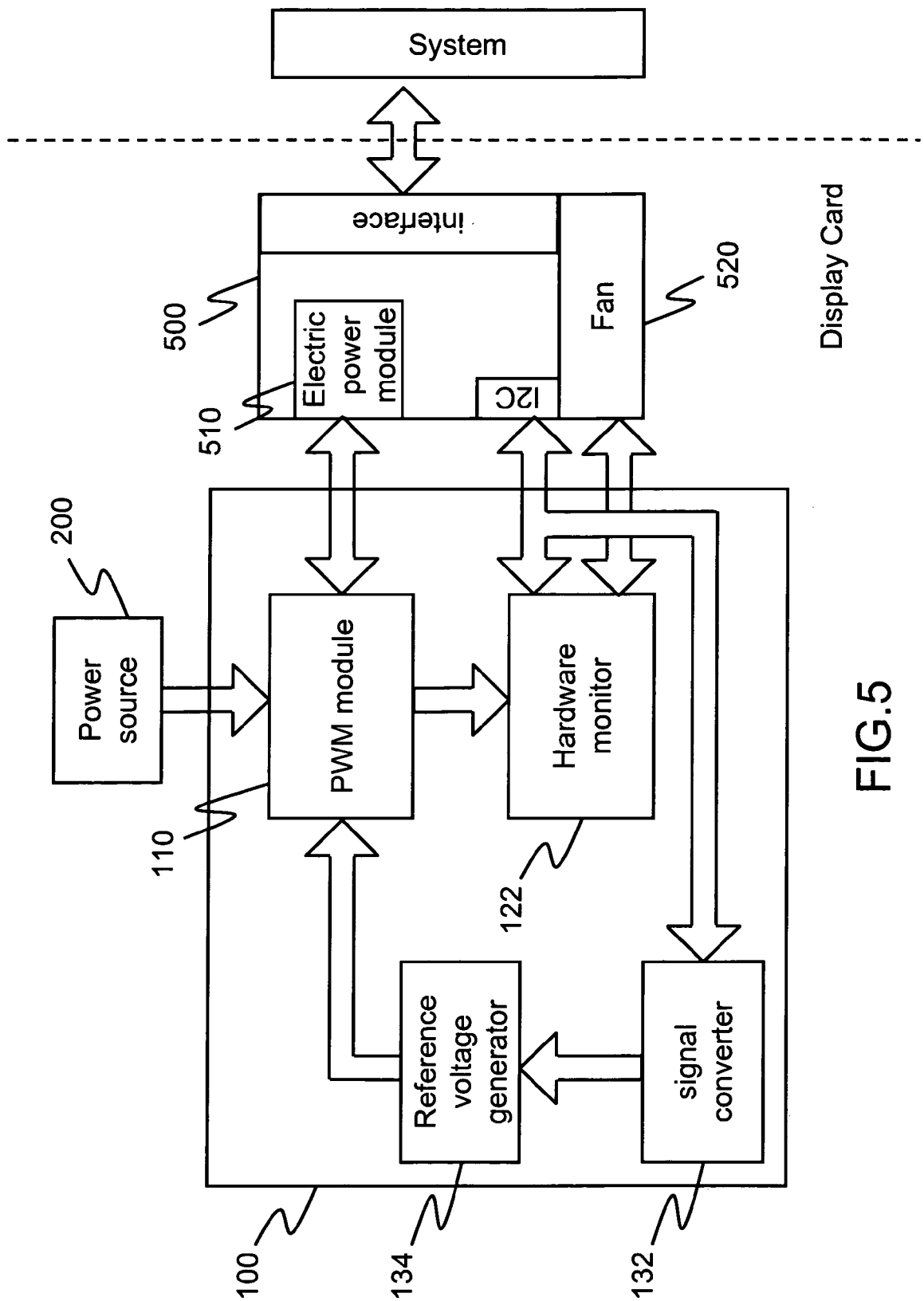
FIG. 5 shows a general structure of the operation monitor device for a hardware component according to a fourth embodiment of the present invention.

For example, supposing an embodiment of the present invention is applied to a display card, the hardware component is a GPU 500 with a fan 520 for heat dissipating, as shown in FIG. 5. The display card communicates with the execution unit, such as a CPU, of the system via a high-speed transmission interface on the GPU 500, such as a Peripheral Component Interconnect Express interface (PCI-E interface), an Accelerated Graphics Port/Advanced Graphics Port (AGP), and the like. Therefore, the hardware monitor 122, i.e., the above monitoring unit, the signal converter 132, and the GPU 500 communicate with each other via an I2C bus. In other words, the hardware monitor 122 is connected to the I2C interface on the GPU 500 through the I2C bus, and then communicates with the system via the high-speed transmission interface on the GPU 500. When the system is converted from a general operation environment, such as, Internet surfing, word processing, and playing a movie, etc., into a three-dimensional (3D) operation environment, such as a 3D game or image processing, etc., the load of the GPU 500 on the display card is increased, and the current consumption is correspondingly increased. The PWM module 110 obtains a load current and thereby learns the current variation through current sensing. The current variation is further converted into a micro voltage to be provided to the hardware monitor 122 to be detected. At this time, the value detected by the hardware monitor 122 is transferred to the application software of the system via the GPU 500 through the I2C bus. Then, the application software converts the value into a practical current value. A monitor signal is fed back to the hardware monitor 122 by an executive program set by the application software according to the practical current value. Thus, according to the monitor signal, the hardware monitor 122 carries out several monitoring actions, such as current displaying, adjusting the working voltage of GPU 500/memory, overload protection mechanism, displaying and controlling the rotating speed of the fan 520, displaying and changing the clock frequency of the GPU 500/memory, and displaying the temperature of the GPU 500/memory, and the like. The hardware monitor 122 generates a modulating signal in response to the monitor signal and transfers the modulating signal to the signal converter 132 via the I2C bus. The signal converter 132 converts the modulating signal into one or more sets of GPIO (General-Purpose Input/Output) signals, i.e., the above control signals, through a built-in conversion table. Then, the reference voltage generator 134 modulates the reference voltage provided to the PWM module 110 according to the built-in parameter table, and further changes the voltage provided to the electric power module 510 of the GPU 500 from the PWM module 110. Therefore, improvement of performance and monitoring can be achieved through carrying out each of the components repeatedly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An operation monitor device for a hardware component, for controlling an output voltage required by the hardware component, wherein the hardware component is operated within a system, comprising:
a pulse width modulation module, for generating the output voltage according to a reference voltage, and detecting a load current generated due to operation of the hardware component, so as to generate a voltage variation;
a monitoring unit, for detecting the voltage variation to output a detecting result to the system, and receiving a monitor signal fed back by the system in response to the detecting result, thereby generating a modulating signal; and
a controller, for generating a new reference voltage according to the modulating signal.

2. The operation monitor device for a hardware component according to claim 1, wherein the controller comprises:
a signal converter, for converting the modulating signal into a set of control signals; and
a reference voltage generator, for generating the new reference voltage according to the set of control signals.

3. The operation monitor device for a hardware component according to claim 2, wherein the signal converter is an integrated circuit.

4. The operation monitor device for a hardware component according to claim 3, wherein a conversion table is built in the integrated circuit and the modulating signal is converted into the set of control signals according to the conversion table.

5. The operation monitor device for a hardware component according to claim 2, wherein the set of control signals is more than one set of General-Purpose Input/Output signals.

6. The operation monitor device for a hardware component according to claim 2, wherein the reference voltage generator is an integrated circuit.

7. The operation monitor device for a hardware component according to claim 6, wherein a parameter table is built in the integrated circuit and the new reference voltage is generated according to the parameter table and the set of control signals.

8. The operation monitor device for a hardware component according to claim 1, wherein the monitoring unit communicates with the controller via an Inter-Integrated Circuit (I2C) bus.

9. The operation monitor device for a hardware component according to claim 1, wherein the monitoring unit communicates with the hardware component via an I2C bus.

10. The operation monitor device for a hardware component according to claim 1, wherein the monitoring unit communicates with the system via a transmission interface on the hardware component.

11. The operation monitor device for a hardware component according to claim 1, wherein the pulse width modulation module comprises:
   a power switch, for receiving an input power source;
   an output circuit, for generating the output voltage according to the input power source passing through the power switch, thereby driving the operation of the hardware component;
   a first impedance component, for receiving the load current to generate a potential difference;
   an integrated circuit, for controlling an ON/OFF state of the power switch according to the new reference voltage and obtaining a current variation through the potential difference; and
   a second impedance component, for converting the current variation into the voltage variation.

12. The operation monitor device for a hardware component according to claim 11, wherein the power switch comprises at least one metal-oxide-semiconductor field effect transistor (MOSFET).

13. The operation monitor device for a hardware component according to claim 11, wherein the input power source is supplied by a power source.

14. The operation monitor device for a hardware component according to claim 1, wherein the monitoring unit is an integrated circuit.

15. The operation monitor device of a hardware component according to claim 14, wherein the integrated circuit is a hardware monitor.

16. The operation monitor device for a hardware component according to claim 1, wherein when the hardware component has a heatsink, and the monitoring unit is used to control operation of the heatsink according to the monitor signal.

* * * * *